United States Patent
Sagfors et al.

(10) Patent No.: US 8,351,328 B2
(45) Date of Patent: Jan. 8, 2013

(54) METHOD AND DEVICE FOR TRANSMITTING TCP DATA OVER ASYMMETRIC LINKS

(75) Inventors: Mats Sagfors, Kyrkslatt (FI); Waqas Akbar, Espoo (FI); Michael Meyer, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 405 days.

(21) Appl. No.: 12/518,484

(22) PCT Filed: Dec. 19, 2006

(86) PCT No.: PCT/SE2006/050598
§ 371 (c)(1), (2), (4) Date: Jun. 10, 2009

(87) PCT Pub. No.: WO2008/076022
PCT Pub. Date: Jun. 26, 2008

(65) Prior Publication Data
US 2010/0091705 A1    Apr. 15, 2010

(51) Int. Cl.
*H04L 12/26* (2006.01)
(52) U.S. Cl. .................. 370/229; 370/230; 370/328
(58) Field of Classification Search ............... 370/229, 370/230, 232, 235, 278, 282, 328
See application file for complete search history.

(56) References Cited

U.S. PATENT DOCUMENTS

| | | | |
|---|---|---|---|
| 6,016,311 A * | 1/2000 | Gilbert et al. | 370/280 |
| 6,697,378 B1 * | 2/2004 | Patel | 370/468 |
| 7,224,703 B2 * | 5/2007 | Antal et al. | 370/473 |
| 7,564,790 B2 * | 7/2009 | Burns et al. | 370/235 |
| 7,653,396 B2 * | 1/2010 | van der Gaast et al. | 455/450 |
| 7,876,679 B2 * | 1/2011 | Hirsimaki et al. | 370/231 |
| 7,944,824 B2 * | 5/2011 | Lee et al. | 370/230 |
| 7,962,146 B2 * | 6/2011 | Ludwig et al. | 455/450 |
| 7,990,905 B2 * | 8/2011 | Lappetelainen et al. | 370/315 |
| 2002/0112057 A1 | 8/2002 | Srinivas et al. | |
| 2003/0050074 A1 * | 3/2003 | Kogiantis et al. | 455/453 |
| 2003/0063564 A1 * | 4/2003 | Ha et al. | 370/230 |
| 2005/0013316 A1 * | 1/2005 | Liao et al. | 370/449 |

(Continued)

FOREIGN PATENT DOCUMENTS
EP    1 633 099 A1    3/2006
(Continued)

OTHER PUBLICATIONS
International Search Report dated Oct. 4, 2007 (4 pages).
(Continued)

*Primary Examiner* — Kwang B Yao
*Assistant Examiner* — Nguyen Ngo
(74) *Attorney, Agent, or Firm* — Myers Bigel Sibley & Sajovec, P.A.

(57) ABSTRACT

In a method and device the TCP load offered in the uplink is manipulated such that an offered load asymmetry is achieved. Using such an arrangement it is possible to compensate for a link asymmetry when uplink and downlink connections are sharing the same uplink buffer in order to increase performance of the downlink. The method and device are capable of increasing the download performance both in the case when TCP connections are terminated in a different device than the terminal where the link layer is terminated, as well as when the TCP connections are terminated in the same device as the link-layer.

13 Claims, 3 Drawing Sheets

U.S. PATENT DOCUMENTS

| | | | | |
|---|---|---|---|---|
| 2005/0243718 | A1* | 11/2005 | Coupechoux et al. | 370/229 |
| 2006/0034239 | A1* | 2/2006 | Abeta et al. | 370/341 |
| 2006/0120321 | A1* | 6/2006 | Gerkis et al. | 370/329 |
| 2008/0080464 | A1* | 4/2008 | Speight | 370/342 |
| 2008/0089250 | A1* | 4/2008 | Jung | 370/276 |

FOREIGN PATENT DOCUMENTS

| | | |
|---|---|---|
| WO | WO 2006/096037 A1 | 9/2006 |

OTHER PUBLICATIONS

L. Kalampoukas et al., "Improving TCP Throughput over Two-Way Asymmetric Links: Analysis and Solutions", Sigmetrics, 1998 ACM Sigmetrics, 28 pages, http://citeseer.ist.psu.edu/cache/papers/cs/686/ftp:zSzzSzftp.cse.ucsc.eduzSzpubzSzhsnlabzSzSigmetrics98.pdf/kalampoukas98improving.pdf.

\* cited by examiner

METHOD AND DEVICE FOR TRANSMITTING TCP DATA OVER ASYMMETRIC LINKS

TECHNICAL FIELD

The present invention relates to a method and a device for transmitting data. In particular the present invention relates to a method and device for simultaneous reception and transmission of data.

BACKGROUND

In wireless transmission links there often exists asymmetries. This is particularly true for cellular telecommunication networks. For example, the downlink can typically support a much higher bit-rate than the corresponding uplink. There are many reasons for such an asymmetry, but one fundamental reason is the fact that the downlink transmitter unit, the base-station, typically can use much higher transmission power compared to the corresponding uplink transmitter unit, the mobile terminal.

Other reasons include e.g. multi-user scheduling and link-adaptation issues: The down link transmitter is typically much better equipped to maintain orthogonality between transmissions to different users e.g. by time-multiplexing. However, multi-user scheduling and link-adaptation in the uplink can be very challenging as the transmitters are geographically distributed. It is also much simpler to introduce transmission diversity in the Multiple Input Multiple Output (MIMO) downlink because, compared to the uplink, the spatial spacing of multiple transmission antennas are not restricted by the terminal size. In general, it is therefore to expect higher bit-rates in the downlink direction compared to the uplink.

An example is the High-Speed Downlink Shared Channel (HS-DSCH) of the standard 3GPP Release-5, which can theoretically support bit-rates beyond 10 Mbps. In practice a couple of Mbps has been achieved in the first product releases. However, the reverse link, the uplink, of Release 5 is carried with dedicated channel DCH, typically supporting 64 kbps and up to 384 kbps in case of good coverage. Release 6 of the wideband code division multiple access WCDMA standard comes with the enhanced dedicated channel (E-DCH) enhancement of the up link. However, the supported bit-rates will still be far below the HS-DSCH downlink bit-rates, particularly at times when the network is loaded with multiple users.

A link of a cellular radio system network having different properties for the uplink and down link, respectively can be termed an "Asymmetric Link". Moreover the bit rate ratio between the uplink and down link provided by the link-layer can be denoted "Asymmetry Ratio". For example, if the downlink layer 2 carries 3.84 Mbps, but the corresponding up-link only 384 kbps, the Asymmetry Ratio is determined to be 10.

It is known that simultaneous upload and download with Transmission Control Protocol (TCP) over such an asymmetric link will constrain the throughput of the direction with the higher bit-rate to a level proportional to the narrower direction, see for example L. Kalampoukas, A. Varma, K. Ramakrishnan "Improving TCP throughput over two-way asymmetric links: Analysis and solutions", Sigmetrics, 1998 ACM SIGMETRICS, http://citeseer.ist.psu.edu/cache/papers/cs/686/ftp:zSzzSzftp.cse.ucsc.eduzSzpubzSzhsnlabz SzSigmetrics98.pdf/kalampoukas98improving.pdf. The reason is that the load offered by TCP in forward direction is based on feedback that must be carried in the reverse direction. If the uplink is loaded and in particular over loaded by other traffic the result is that this feedback in the form of acknowledgement messages (ACKs) are delayed, which will prevent TCP from clocking out new data on the downlink path with the desired pace. This is described below in conjunction with FIG. 1 and FIG. 2.

Thus, in FIG. 1, the TCP sender in the Server maintains a transmission window, and each acknowledgement, illustrated by smaller packets 103 on the reverse link clocks out new data, large packets 101, from the Server. The downlink TCP connection can offer sufficient load to the downlink path only in case the acknowledgements on the reverse link arrive with sufficient pace.

FIG. 2 illustrates two simultaneous TCP connections, one in downlink illustrated by large packets 101 and small ACK packets 103 and one in uplink illustrated by large striped packets 201 and small striped ACK packets 203. Compared to the scenario illustrated in FIG. 1, the uplink will now be saturated with TCP segments 201 from the upload connection that will hinder the TCP ACKs 103 of the downlink connection from being transmitted at sufficient pace. This means that also the downlink performance is constrained by the uplink bit-rate.

Because link asymmetry is common in wireless radio system accesses and it will so remain, it is desired to find a solution that would enhance the down-link performance at times of simultaneous upload and download.

SUMMARY

It is an object of the present invention to overcome or at least reduce some of the problems associated with the downlink performance at times of simultaneous upload and download.

It is another object of the present invention to provide a method and a device that is capable of increasing the download performance both in the case when TCP connections are terminated in a different device than the terminal where the link layer is terminated, as well as when the TCP connections are terminated in the same device as the link-layer.

These objects and others are obtained by the method and device as set out in the appended claims. Thus, by manipulating the TCP load offered in the uplink, such that an offered load asymmetry is achieved, it is possible to compensate for the link asymmetry even when uplink and downlink connections are sharing the same uplink buffer. It is hence beneficial to limit the TCP window to a smaller value at times of two-way TCP traffic.

In accordance with one aspect of the present invention the TCP load offered in the uplink is set, such that the load offered by the uplink TCP is reduced to a fraction of the TCP window advertised by the terminal.

In accordance with still another aspect of the present invention the link asymmetry is monitored in the client, i.e. the Asymmetry Ratio offered by the link-layer, and set the ratio of the RWIN advertised by the client and the maximum TCP window offered in the uplink equal to the Asymmetry ratio.

Ideally, if the Asymmetry Ratio is, for example 3, then the load offered in the uplink (maximum window in the uplink) should be one third of the window advertised by the terminal to the downlink server. The window advertised by the terminal to the downlink server is known as the RWIN (TCP Receive Window) and is the amount of data that the downlink transmitter, here the server, is allowed to have outstanding without acknowledgements from the receiver.

In accordance with another aspect of the invention, in case of multiple uplink TCP connections, the maximum offered load is distributed, such that the maximum uplink load is evenly distributed among the active uplink TCP connections.

In accordance with yet another aspect of the invention, the maximum uplink load is increased to the advertised RWIN of the uplink receiver at times when the activity of the downlink TCP connection or the downlink connections are terminated.

In some cases the load offered in the uplink cannot be reduced by adjusting the maximum uplink TCP window because such an approach usually requires that the TCP connections are terminated in the same device as the link layer of the asymmetric link whereby the TCP connections can be adjusted to match the particular character of the wireless asymmetric link. Thus, in many cases it is not possible to change the TCP implementation or parameters in TCP, but the TCP implementation is an in-built part of a standard operating system. This is for example the case when a computer is connected via a mobile terminal to the network.

Hence, in accordance with yet another aspect of the present invention a method and a device are provided for selectively discarding uplink TCP segments resulting in an improved load asymmetry.

In accordance with yet another aspect of the present invention a method and a device are adapted to implement a dynamic uplink buffer in a terminal, such as a mobile terminal that adapts the uplink buffer to a small size, in particular at times when simultaneous uplink and downlink traffic is detected. In case no traffic is detected in the downlink, then the uplink buffer is preferably allowed to grow to a larger size. In accordance with yet another preferred embodiment the method and device can be adapted to selectively drop large packets in favor of small packets. Also it is possible to limit the uplink buffering time to a low value at times of simultaneous uplink and downlink traffic, and to a larger value when only uplink traffic is detected.

Using the method and device in accordance with the invention will provide considerable improvements in download TCP performance at times of simultaneous uploading. The solutions as described herein can be implemented directly into a device, such as a mobile terminal without any changes to existing servers, transport or link-layer protocols. The method and device in accordance with the invention are able to support scenarios both when TCP connections are terminated in a different device than the terminal where the link layer is terminated as well as when the TCP connections are terminated in the same device as the link-layer for example if the terminal is a hand-held device with an in-built browser or FTP client.

BRIEF DESCRIPTION OF THE DRAWINGS

The present invention will now be described in more detail by way of non-limiting examples and with reference to the accompanying drawings, in which.

DETAILED DESCRIPTION

Figure 1:
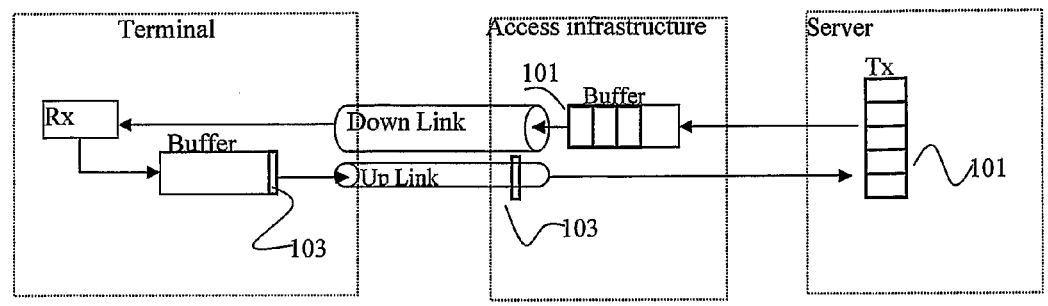
FIG. 1 is a view of a TCP connection between a server and a terminal
Figure 2:
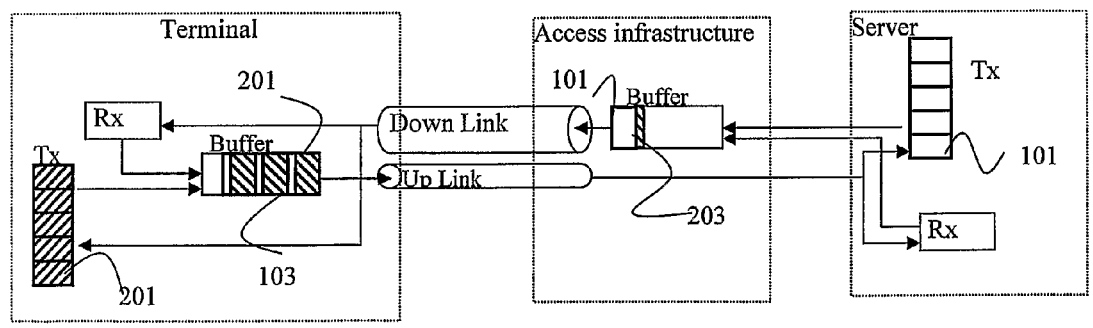
FIG. 2 is a view of a simultaneous TCP connection between a server and a terminal and a terminal and a server where the two TCP connections share the same link.
Figure 3:
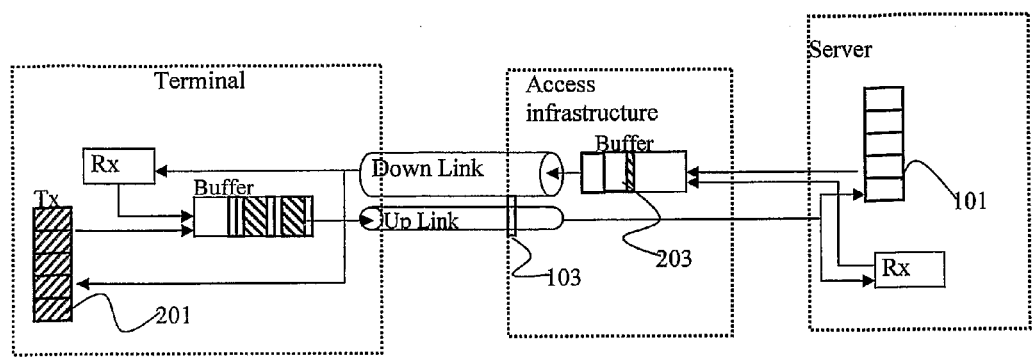
FIG. 3 is a view of a simultaneous TCP connection between a server and a terminal and a terminal and a server where the two TCP connections share the same link in accordance with a first embodiment of the invention.

In FIG. 3, a view of two simultaneous TCP connections, one in the down link and one in uplink set up between a server, such as a regular content server a terminal such as a mobile terminal in a radio network is shown. Note that the TCP connections can be terminated in different servers, while for illustrative simplicity; the example is now illustrated with a single server.

The access infrastructure used for connecting the server and the terminal can for example be UTRAN, CDMA2000, LTE etc. Compared to conventional TCP connections the uplink TCP connection is adapted to offer a load which is half of the load in the down link. This is achieved by limiting the TCP window of the upload connection to one half of the TCP window offered by the download TCP connection. The result is that the throughput achieved by the download connection will be twice as large as the upload connection given that each ACK clocks out one segment of equal size for both connections. This is because, on average, using the technique shown in FIG. 3 there are two download ACKs in the uplink buffer per each uplink TCP segment. This would improve the use of a downlink having higher capacity than the corresponding uplink in the case of simultaneous upload and download to/from the mobile terminal.

Hence, by measuring the Asymmetry Ratio (i.e. the ratio of the uplink and downlink bitrates) and adapting the load offered to the uplink in response to the measured link rates the higher capacity of the down link can be better utilized. In particular the link asymmetry can be monitored in the terminal, i.e. the Asymmetry Ratio offered by the link-layer. The terminal can further be configured to set the ratio of the RWIN advertised by the terminal and the maximum TCP window offered in the uplink equal to the Asymmetry ratio.

In accordance with a preferred embodiment, the ratio of the load offered in the uplink and the window advertised by the terminal to the downlink server is set to correspond to the Asymmetry Ratio.

Furthermore, if there are multiple uplink TCP connections, the offered load is preferably distributed, such that the maximum uplink load is evenly distributed among the active uplink TCP connections. Also, it is preferred to increase the maximum uplink load to the advertised RWIN of the uplink receiver at times when the activity of the downlink TCP connection or the downlink connections are terminated.

As described above under asymmetric link conditions it is desirable to have the downlink TCP connection offer a larger TCP window compared to the window offered by the uplink TCP connection in order to benefit from the high capacity of the downlink. In the case when the TCP connection and the link layer are terminated in the sane device this can be achieved by manipulating the window of the uplink connection to match the asymmetry of the link as described above in conjunction with FIG. 3. However, the technique described in conjunction with FIG. 3 may not be possible to utilize in case when the TCP connection is terminated in a standard device, for example a PC outside the terminal where the link layer is terminated. This can for example be the case when a PC uses a mobile terminal to access a radio network.

Figure 4:
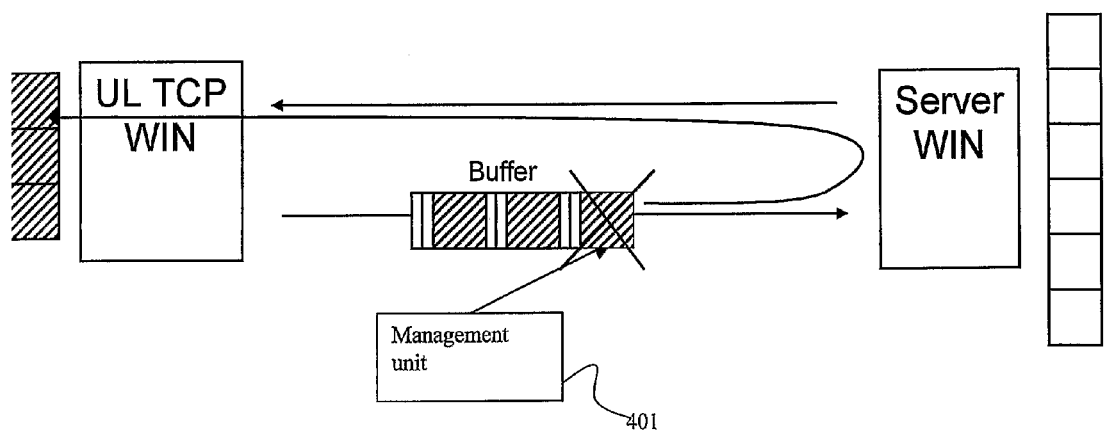
FIG. 4 is a view of a simultaneous TCP connection between a server and a terminal and a terminal and a server where the two TCP connections share the same link in accordance with a second embodiment of the invention.

Under such circumstances another method for reducing the load offered in the uplink is required. In FIG. 4 a view of a simultaneous TCP connection between a server and a terminal and a terminal and a server where the two TCP connections share the same link is shown. In contrast to the TCP connection depicted in FIG. 3, the TCP connection is not terminated in the terminal but outside the terminal. To control the load offered in the uplink in such a scenario a buffer management unit 401 is implemented in the terminal, by which it is ensured that the uplink TCP connection reduce its window size. The buffer management unit is adapted to drop or mark, by means of ECN marking, uplink TCP segments. By discarding some of the TCP uplink segments a load asymmetry is obtained. As a result of the load asymmetry the download performance is enhanced.

In accordance with a preferred embodiment buffer management unit 401 is adapted to implement a dynamic uplink buffer in the terminal, the terminal for example being a mobile terminal, and configured to adapt the uplink buffer to a small size, in particular at times when simultaneous uplink and downlink traffic is detected. In case no traffic is detected in the downlink, then the buffer management unit 401 preferably is adapted to allow the uplink buffer to grow to a larger size. Moreover in accordance with yet another preferred embodiment the buffer management unit 401 can be adapted to selectively drop large packets in favor of small packets.

It is further to be observed that losses of uplink TCP segments will trigger TCP congestion control, which will result in dynamic adjustment in the used uplink TCP window size. It should also be observed that losses of cumulative Acknowledgements carried in the uplink do not result in TCP congestion control actions of the downlink TCP connection.

Figure 5:
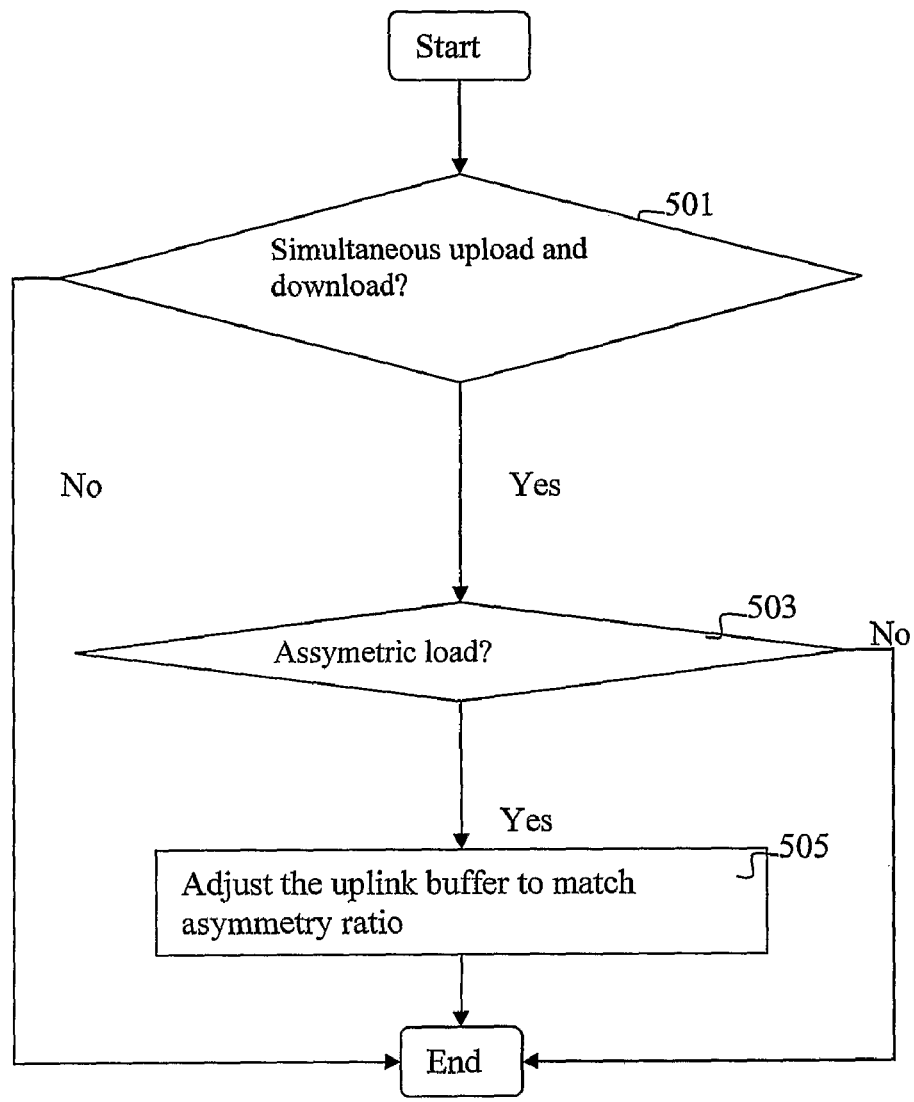
FIG. 5 is a flow chart illustrating step performed in a terminal.

In FIG. 5, a flowchart illustrating some procedure steps performed in a terminal is shown. Thus, first in a step 501, the terminal checks if there is simultaneous upload and download. If there is simultaneous upload and download the procedure continues to a step 503 and else the procedure ends.

In step 503 the procedure determines is there is a link asymmetry between the upload link and the download link and if so what the link ratio is. If there is a link asymmetry between the upload link and the download link the procedure continues to a step 505 and else the procedure ends.

In step 505 the procedure adapts the load offered in the uplink by means suitable for the application at hand, e.g. by applying one of the methods as described herein. Hence, should for example the asymmetry ratio be determined to be five only one fifth of the load is applied to the uplink.

Using the method and device as described herein will provide considerable improvements in download TCP performance at times of simultaneous uploading. The solution as described herein can be implemented directly into a mobile device without any changes to existing servers, transport or link-layer protocols.

The invention claimed is:

1. A method of transmitting data over an uplink on a Transmission Control Protocol (TCP) connection through a terminal between a device and a server, the method comprising:
    determining, by the terminal that is separate from the device, whether the TCP connection is terminated outside the terminal in the device;
    responsive to determining that the TCP connection is terminated outside the terminal, adjusting by the terminal a load provided to the uplink TCP connection from the terminal to the server to a fraction of a maximum TCP uplink window advertised by an uplink receiver of the server, wherein the TCP uplink window is an amount of data that the terminal is allowed to have outstanding as transmitted without receiving acknowledgement from the uplink receiver, and
    transmitting data from the terminal on the uplink TCP connection at said fraction of the maximum TCP uplink window,
    wherein adjusting the load offered to the uplink TCP connection comprises selectively discarding, by the terminal, TCP segments in the uplink to adjust the load.

2. The method according to claim 1, further comprising discarding large TCP segments in front of small TCP segments to adjust the load offered to the uplink TCP connection.

3. The method according to claim 1, where the adjustment of offered load is only executed when there is one or several simultaneous TCP downlink connections from one or several servers to the terminal.

4. The method according to claim 1, further comprising:
    limiting a maximum TCP uplink window of one or several corresponding TCP downlink from one or several servers to the terminal, wherein the TCP downlink window is an amount of data that the corresponding server is allowed to have outstanding as transmitted without receiving acknowledgement from the terminal.

5. The method according to claim 1, where multiple uplink TCP connections exist, and where the method further comprises:
    distributing the uplink load evenly over the multiple uplink TCP connections.

6. The method according to claim 1, further comprising: resetting the load to the original maximum load upon detection of a terminated TCP downlink connection.

7. A terminal for transmitting data over an uplink TCP connection between a device and a server, the terminal comprising:
    a buffer management unit for responding to a determination that the TCP connection is terminated outside the terminal in the device, by adjusting a load provided to the uplink TCP connection from the terminal to the server to a fraction of a maximum TCP uplink window advertised by an uplink receiver of the server, wherein the TCP uplink window is an amount of data that the terminal is allowed to have outstanding as transmitted without receiving acknowledgement from the uplink receiver; and
    means for transmitting data on the uplink TCP connection at said fraction of the maximum TCP uplink window advertised by the uplink receiver,
    wherein the buffer management unit for adjusting the load offered to the uplink TCP connection discards TCP segments in the uplink to adjust the load.

8. The device terminal according to claim 7, wherein the buffer management unit for adjusting the load offered to the uplink TCP connection discards large TCP segments in front of small TCP segments to adjust the load offered to the uplink TCP connection.

9. The terminal according to claim 7, wherein the buffer management unit if further configured for selectively adjusting the offered load in response to an existence of a simultaneous TCP link connection from the server to the terminal.

10. The terminal according to claim 7, further comprising:
    means for determining a bitrate of a corresponding TCP downlink from the server to the terminal.

11. The terminal according to claim 7, further comprising:
    means for distributing the uplink load evenly over multiple uplinks.

12. The terminal according to claim 7, further comprising:
    means for resetting the load to the original maximum load upon detection of a terminated TCP downlink connection.

13. The terminal according to claim 7, where the terminal is a mobile terminal.

* * * * *

UNITED STATES PATENT AND TRADEMARK OFFICE
CERTIFICATE OF CORRECTION

PATENT NO. : 8,351,328 B2  
APPLICATION NO. : 12/518484  
DATED : January 8, 2013  
INVENTOR(S) : Sågfors et al.

Page 1 of 1

It is certified that error appears in the above-identified patent and that said Letters Patent is hereby corrected as shown below:

On the Title Page, in Item (75), under "Inventors", in Column 1, Line 1,  
delete "Mats Sagfors, Kyrkslatt (FI);" and  
insert -- Mats Sågfors, Kyrkslätt (FI); --, therefor.

In the Specifications:

In Column 1, Lines 65-66, delete space between ".eduzSzpubzSzhsnlabz SzSigmetrics98" and  
insert -- .eduzSzpubzSzhsnlabzSzSigmetrics98 --, therefor.

In the Claims:

In Column 6, Line 45, in Claim 8, delete "device terminal" and insert -- terminal --, therefor.

Signed and Sealed this  
Fourth Day of June, 2013

Teresa Stanek Rea  
*Acting Director of the United States Patent and Trademark Office*